(12) United States Patent
Watkins

(10) Patent No.: US 6,206,405 B1
(45) Date of Patent: Mar. 27, 2001

(54) MOBILE SEATING ARRANGEMENT

(75) Inventor: Mervyn M. Watkins, Rancho Palos Verdes, CA (US)

(73) Assignee: Convaid Products Inc., Torrance, CA (US)

( * ) Notice: Subject to any disclaimer, the term of this patent is extended or adjusted under 35 U.S.C. 154(b) by 0 days.

(21) Appl. No.: 08/893,483

(22) Filed: Jul. 11, 1997

Related U.S. Application Data

(60) Provisional application No. 60/026,303, filed on Sep. 16, 1996.

(51) Int. Cl.[7] .............................. B62B 7/06; B62B 11/00
(52) U.S. Cl. ......................... 280/647; 280/649; 280/650
(58) Field of Search ................................ 280/647, 47.38, 280/47.4, 47.41, 47.35, 47.34, 649, 650, 642, 643, 42, 644, 648, 250.1, 304.1, 907; 297/328, 326, 327, 377, 329, 330

(56) References Cited

U.S. PATENT DOCUMENTS

| | | | | |
|---|---|---|---|---|
| 172,665 | * | 1/1876 | Sleight | 297/19 |
| 331,111 | * | 11/1885 | Batton | 297/61 |
| 521,463 | * | 6/1894 | Smith-Fraser | 297/372 |
| 523,903 | * | 7/1894 | McPhee et al. | 297/27 |
| 533,727 | * | 2/1895 | McCaffrey | 297/80 |
| 564,253 | * | 7/1896 | McCaffrey | 297/70 |
| 825,984 | * | 7/1906 | Schmersahl | 297/91 |
| 847,332 | * | 3/1907 | Hart | 297/320 |
| 1,650,826 | * | 11/1927 | Fargo | 280/47.4 |
| 2,694,437 | * | 11/1954 | Glaser | 280/47.4 |
| 2,762,422 | * | 11/1956 | Stratton | 297/339 |
| 3,784,252 | * | 1/1974 | Peterson | 297/364 |
| 3,881,773 | * | 5/1975 | Rodaway | 280/250.1 |
| 3,968,991 | * | 7/1976 | Maclaren | 297/45 |
| 4,030,769 | * | 6/1977 | Peng et al. | 280/42 |
| 4,062,555 | * | 12/1977 | Peng et al. | 280/42 |
| 4,084,849 | * | 4/1978 | Ishida et al. | 297/22 |
| 4,310,167 | * | 1/1982 | McLaurin | 280/250.1 |
| 4,339,013 | * | 7/1982 | Weigt | 180/6.5 |
| 4,435,012 | * | 3/1984 | Kassai | 297/354.12 |
| 4,453,732 | * | 6/1984 | Assanah et al. | 280/648 |
| 4,639,012 | * | 1/1987 | Jensen | 280/642 |
| 4,655,471 | * | 4/1987 | Peek | 280/250.1 |
| 4,723,815 | * | 2/1988 | Kassai | 297/354.12 |
| 4,762,335 | * | 8/1988 | Kassai | 280/649 |
| 4,763,911 | * | 8/1988 | Gebhard et al. | 280/37 |
| 4,893,827 | * | 1/1990 | Gay et al. | 280/250.1 |
| 4,974,905 | * | 12/1990 | Davis | 297/377 |
| 5,044,647 | * | 9/1991 | Patterson | 280/250.1 |
| 5,154,438 | * | 10/1992 | Barclay | 280/250.1 |
| 5,240,277 | * | 8/1993 | Scheulderman | 280/650 |
| 5,294,141 | * | 3/1994 | Mentessi et al. | 280/250.1 |
| 5,333,887 | * | 8/1994 | Luther | 280/250.1 |
| 5,547,256 | * | 8/1996 | D'Antuono et al. | 297/377 |
| 5,806,877 | * | 9/1998 | Huang | 280/642 |
| 5,882,083 | * | 3/1999 | Robinson | 297/440.2 |
| 6,003,891 | * | 12/1999 | Broadhead | 280/304.1 |

* cited by examiner

Primary Examiner—Brian L. Johnson
Assistant Examiner—Bridget Avery
(74) Attorney, Agent, or Firm—Oppenheimer Wolff & Donnelly LLP

(57) ABSTRACT

An improved folding mobile seating structure with a seat and back portion movable relative to a framework, providing more comfort for the user. The seat and back portion may be moved relative to the supporting framework structure as a unit in a pivotal motion relative to the framework, or the arrangement may allow some degree of articulation between the seat and the back. The structure is foldable and is light in weight. The seat and back portion may be pivotal between an upright seating condition and at least a partial recumbent condition, and optionally to a flat horizontal condition. Telescoping tubes may be utilized for connection of the seat and/or the back to the framework for allowing the pivotal motion.

8 Claims, 12 Drawing Sheets

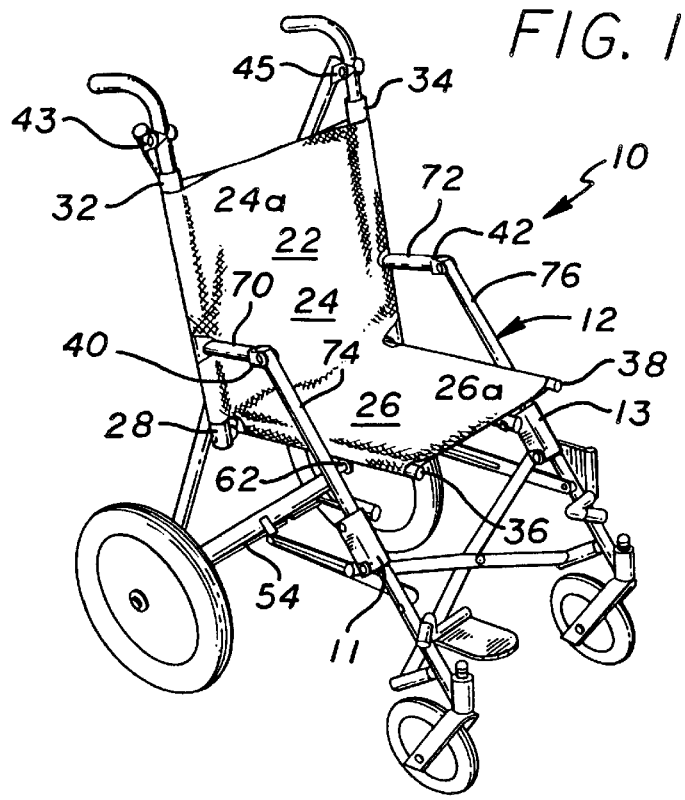

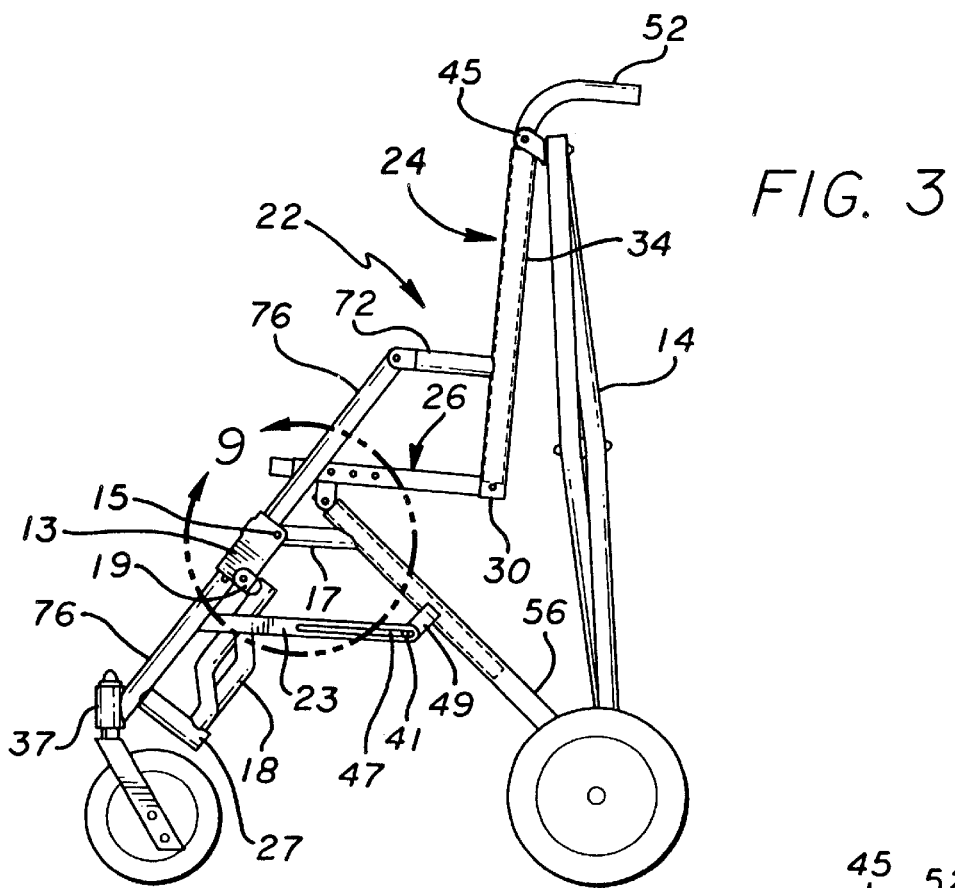
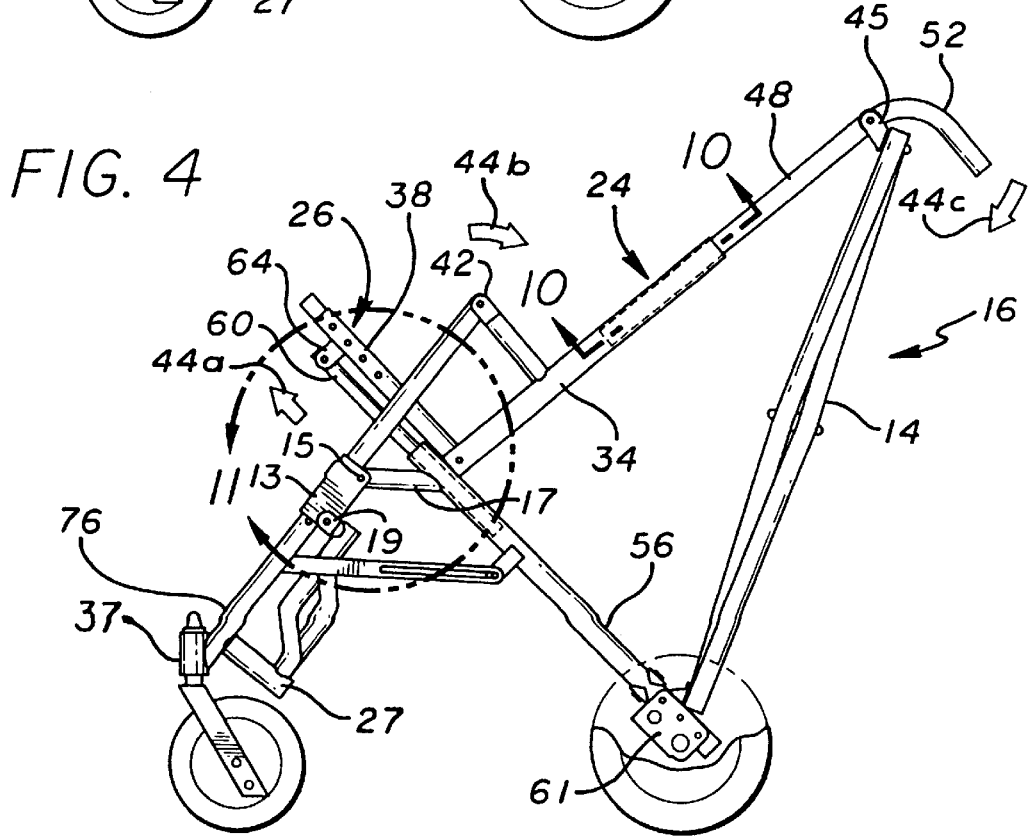

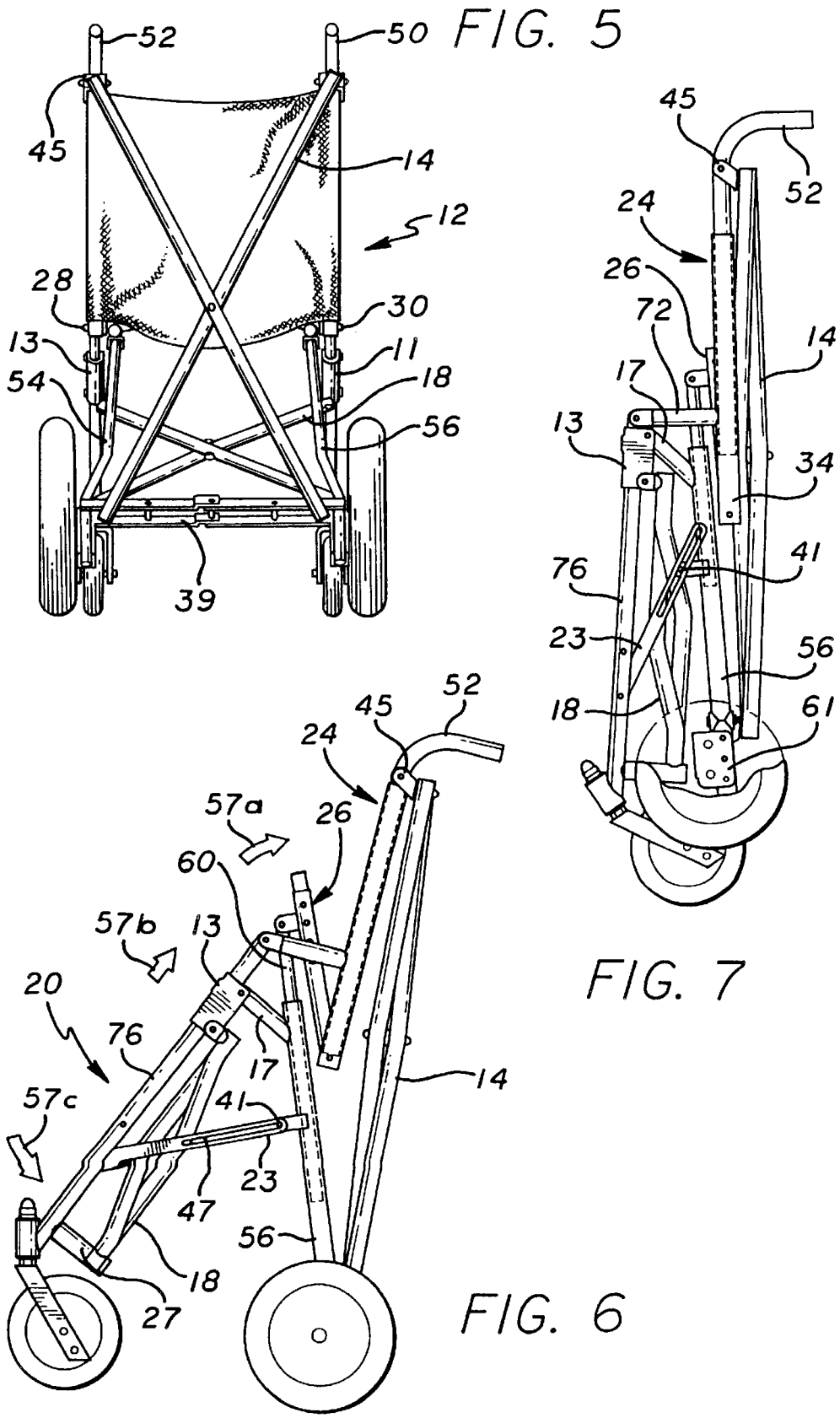

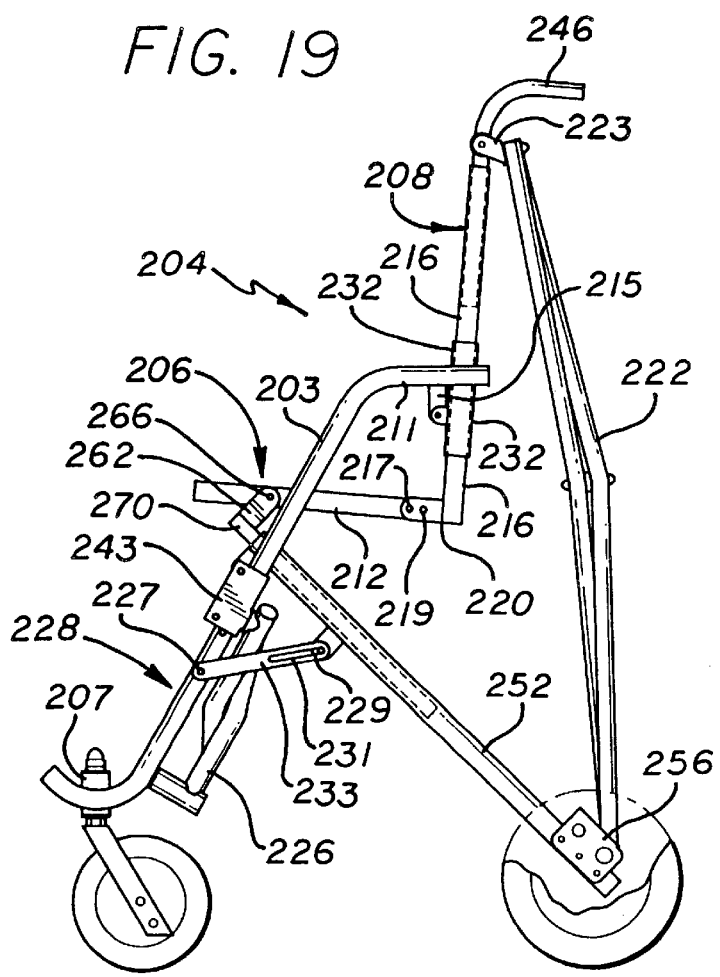
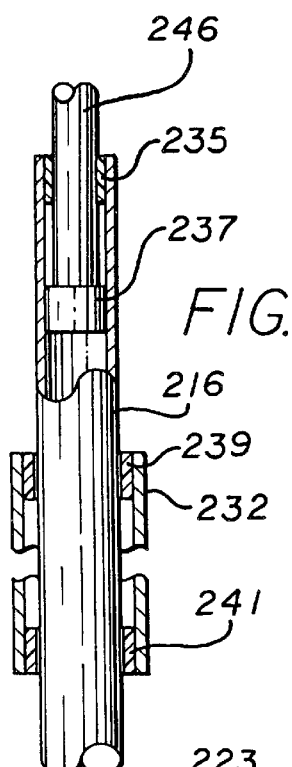
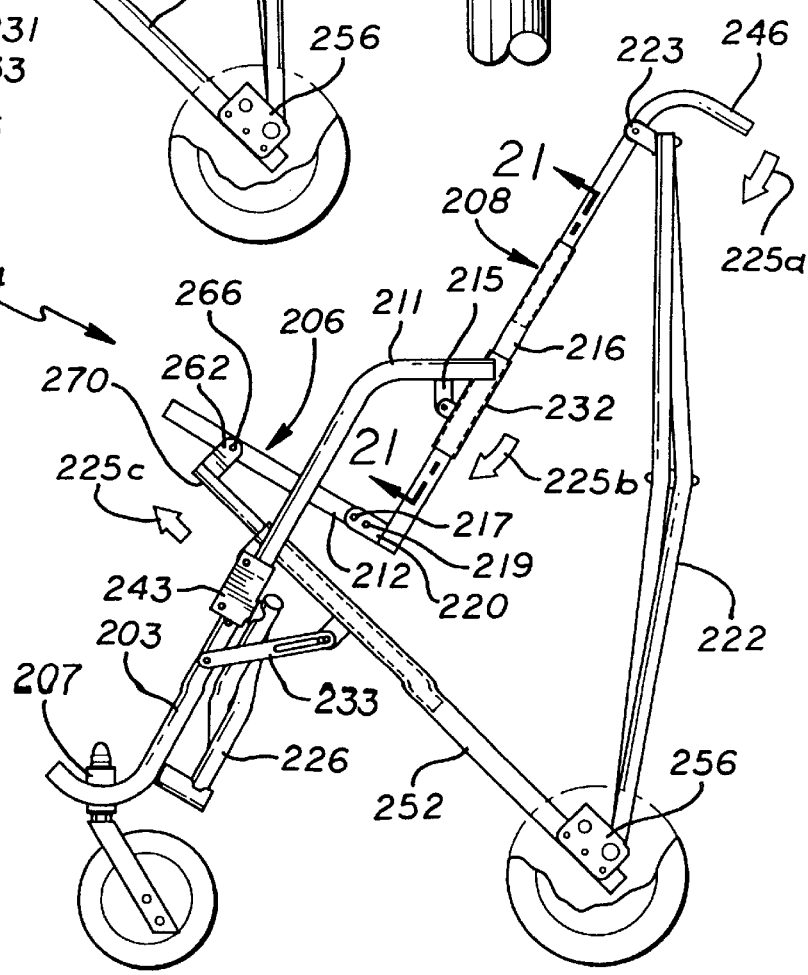

MOBILE SEATING ARRANGEMENT

This application claims the benefit of Provisional No. 60/026,303 filed Sep. 16, 1996.

REFERENCE TO RELATED PATENT

This invention is an improvement to the invention disclosed and claimed in my U.S. Pat. No. 3,995,882, issued Dec. 7, 1976 and the teaching and technology thereof are incorporated herein by reference.

BACKGROUND OF THE INVENTION

1. Field of the Invention

This invention relates to the movable seating structures generally called strollers, and more particularly to incorporation of the present invention in a foldable stroller of the type such as disclosed in my U.S. Pat. No. 3,995,882.

2. Description of the Prior Art

Prior art folding strollers, such as disclosed in my prior U.S. Pat. No. 3,995,882, have been used for the transport of infants, children, invalids, persons partially paralyzed or suffering from some debilitating disease or condition, wherein such person may be too weak to walk unassisted, and in other desired applications. Often it is desired to have the stroller foldable so as to allow the stroller to be conveniently transported or stored when not in use. Such storage may be, for example, in the trunk of an automobile, under a bed, or the like.

When in use, however, such prior art foldable strollers provide only one position of the seat and back relative to the framework and/or the folding structure. Such single position was not, in certain applications and uses, the most comfortable for the person being transported in the stroller. For example, if the person being so transported in the stroller falls asleep, a more recumbent position may be desired than is provided in the upright seating condition. Additionally, when the stroller is pushed over or down some obstruction, such as a curb or the like, it is desired for both comfort and safety, to shift the center of gravity of the combined person and stroller so that the person does not fall from the stroller or undergo the sensation of being about to fall from the stroller. The seat and back structure must, at all times during use, provide secure seating conditions regardless of the relative movement thereof with respect to the supporting framework. For convenient use, the weight of the entire structure must be kept to a minimum consistent with the safety requirements so that it may be easily carried, moved and placed into and removed from a storage location by one person.

Definitions

In this specification, the following definition of terms used will be assumed.

An "X member" shall mean a two-element scissors-like assembly in which the two cross elements are elongated members pivotally attached together at their intermediate regions, the assembly having the general appearance of an "X". The elements may lie substantially in a common plane, such as the "X" member 14 in FIGS. 1–11 (except where they cross in the middle), or may have their elements on one side of the pivotal attachment lying generally in one plane and their elements on the other side of the pivotal attachment generally lying in a nonparallel plane, such as the "X" member 104 in FIGS. 12–16. Due to the pivotal attachment of the two cross elements, when the top or bottom element ends are drawn together horizontally, the "X" member lengthens vertically, and vice versa. Likewise, when the left or right element ends are drawn together vertically, the "X" member lengthens horizontally, and vice versa.

The term "collapsed" shall mean structurally reduced in dimension, as by folding and/or the pivoting toward one another of pivotally joined members.

The term "expanded" shall mean structurally increased in dimension, as by unfolding and/or the pivoting away from one another of pivotally joined members.

The terms "left", "right", "front", and "back" (or "rear") shall refer to those positions as they pertain to the orientation of a person sitting in the mobile seating arrangement.

The term "framework" shall mean basic mobile seating arrangement structure upon which, or with which, structure implementing features of the present invention can be placed or implemented. Typically, a "framework" will include the wheels, or other floor support structure, and associated connection members such as front and rear leg members.

Describing elements of construction and functions in a symmetrical apparatus

Due to the symmetry of the mobile seating arrangement about a front-to-rear center line, the right side counterparts of elements of the construction are not visible in the various left elevation views presented in the accompanying drawing. For convenience in describing such left elevation views, only the elements visible from the left will be described as singular elements. It will be understood that corresponding elements of the apparatus which would only be viewed from a right elevation depiction exist and have corresponding physical and mechanical features and functions. Occasionally, it is more reasonable to refer to symmetrical parts in a plural sense, such as mentioning arm rests, even though the view being described shows only one arm rest. It will be understood, therefore, that where singular terminology is used for elements that obviously have mirror image counterparts, such singular terminology is used for convenience only.

SUMMARY OF THE INVENTION

It is an object of the present invention to provide a more comfortable mobile seating structure.

It is another object of the present invention to provide a mobile seating structure in which the seat and the back portion thereof may be moved relative to the supporting framework structure.

It is another object of the present invention to provide a mobile seating structure in which the seat and the back portion may be generally moved as a unit in a pivotal motion relative to the framework or supporting structure.

It is another object of the present invention to provide a secure mobile seating arrangement in which the seat and back portion are pivotally moved as a unitary structure relative to the framework and which allows some degree of articulation between the seat and the back and is light in weight.

While the present invention has particular utility in the field of folding strollers, such application is not limiting, since the principles of the present invention may be adapted to wheel chairs, other mobile seating arrangements whether foldable or not, or even to stationary seating arrangements. The following description showing the adaptation of the present invention to a folding stroller is for purposes of illustrating the broad application of the structure of the present invention.

The above, and other objects of the present invention, are achieved by incorporating, in a folding stroller structure having a framework portion, a seat and back portion which are unitarily movably mounted on the framework portion for pivotal movement between a seating condition and a partial recumbent position. The sides of the seat and the sides of the back incorporate rigid tubes which are connected to each other at the bottom of the back and the rear of the seat. The connection between the seat and back tubes may be rigid to provide a fixed angle between the seat and the back for all pivotal positions on the framework or the seat may be pivotally connected to the back for limited movement of the back relative to the seat to change the angle therebetween for various positions of the seat and back relative to the framework. Telescoping tubes may be utilized for connection of the seat and/or the back to the framework for allowing the pivotal motion.

Other embodiments of the present invention, as described below, incorporate various other structures for achieving the desired pivotal movement of the seat and back portion with respect to the framework.

BRIEF DESCRIPTION OF THE DRAWING

The above, and other embodiments of the present invention may be more fully understood from the following detailed description taken together with the accompanying drawing wherein similar reference characters refer to similar elements throughout and in which:

FIG. 1 is a right side perspective view of a mobile seating arrangement in accordance with one embodiment of the invention, showing the seat and back portion in an upright position;

FIG. 2 is a similar view to that of FIG. 1, but with the seat and back portion reclined to a recumbent position:

FIG. 3 is a left side elevation view of the FIG. 1 embodiment, showing the main structural components and their mechanical relationship when the seat and back portion is in the upright position;

FIG. 4 is a view similar to that of FIG. 3, but with the seat and back portion in the recumbent position;

FIG. 5 is a rear elevation view of the embodiment of FIG. 1 with the seat in the upright position;

FIG. 6 is a left side elevation view similar to that of FIG. 4, but with the folding framework structure partially collapsed into a stowaway condition;

FIG. 7 is a view similar to that of FIG. 6, but with the apparatus fully collapsed into a stowaway condition;

FIG. 19 is a left side elevation view of the FIG. 17 embodiment, showing the main structural components and their mechanical relationship when the seat and back portion is in the upright position;

FIG. 20 is a view similar to that of FIG. 19, but with the seat and back portion in the recumbent position;

FIG. 21 is a partial cross sectional view of the left rigid side member and telescoping tube, taken along the lines 21—21 in FIG. 20;

DESCRIPTION OF THE PREFERRED EMBODIMENTS

Figure 8:
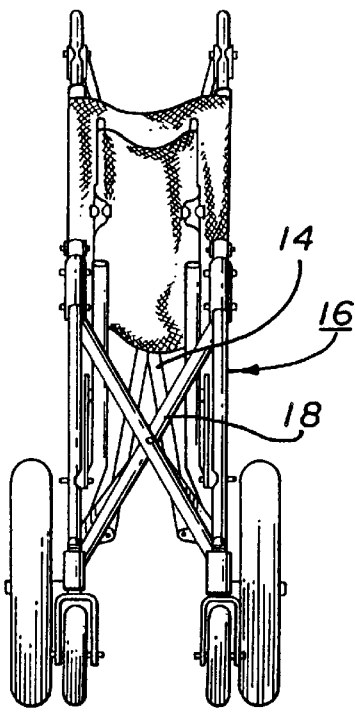
FIG. 8 is a front elevation view of the fully collapsed mobile seating arrangement, i.e. as would be viewed from the left of FIG. 7.

In the detailed description that follows, all references to right and left parts followed by two reference numerals are to be understood to have respective part and reference numeral correspondences. Furthermore, since right-side mirrored counterparts cannot be seen in a left elevational view, it is to be understood that the mention of a viewable part and its single reference numeral suggests that a mirrored corresponding part exists on the right side as well.

Embodiment of FIGS. 1–11

Referring now to FIGS. 1 through 11 of the drawing, there is illustrated an embodiment of the present invention generally designated 10, which is provided with a folding framework 12 having a first or rear "X" member 14 in the framework back 16 and a second or front "X" member 18 in the framework front 20. A seat and back portion 22 having a back member 24 and a seat member 26 are coupled together for a pivotal relation therebetween at right and left couplers 28 and 30. The seat and back portion 22 may have a fabric covering as illustrated as back fabric covering 24a and seat fabric covering 26a, or any other desired support for the person using the embodiment 10, for example webs, straps, ropes, bands, etc.

Rigid right and left side members 32 and 34 are provided on the back member 24, and rigid right and left side members 36 and 38 are provided on the seat member 26 for connection to the back member 24 at right and left couplers 28 and 30.

Right and left arm posts 70 and 72 are fixed to, and extend outwardly from, the rigid side members 32 and 34. Right and left pivot couplings 40 and 42 are provided between the extended ends of right and left arm posts 70 and 72 of the seat and back portion 22 and the tops of right and left leg members 74 and 76 of folding framework 12, to allow the seat and back portion 22 to move, i.e. tilt, in the directions of the arrow 44 (FIG. 2) relative to folding framework 12 as shown in FIG. 2, or in the direction of arrow 44b in FIG. 4.

Right and left telescoping tubes 46 and 48 are connected to the right and left handles 50 and 52 and telescope into and out of the right and left rigid side members 32 and 34 of the back member 24.

Folding framework 12 has right and left base members 54 and 56 in which right and left telescoping tubes 58 and 60 are slidably mounted. The telescoping tubes 58 and 60 are pivotally connected by right and left pivot couplers 62 and 64 to the fronts of right and left rigid side members 36 and 38.

As the seat and back portion 22 is move from the position shown in FIG. 1 to the position shown in FIG. 2, the telescoping tubes 46 and 48 move out of the rigid side members 32 and 34, and the telescoping tubes 58 and 60 move out of the base members 54 and 56. Such movement of the telescoping tubes allows the seat and back portion 22 to move to the recumbent position of FIG. 2 from the upright seating position of FIG. 1. The backward pivotal movement of the seat and back portion 22 moves the center of gravity of the embodiment 10, and the person utilizing the embodiment 10, rearwardly for safer control in going over obstacles, such as going down curbs, as well as for providing a more comfortable sleep position, as seen in FIG. 2.

FIG. 3 is a left elevational view of the arrangement shown in FIG. 1, with the seat and back portion 22 in the upright position. In this position, the seat member 26 and the back member 24 are essentially at right angles to one another. In this condition, a sliding connector bracket 13 (only sliding connector bracket 13 is shown in FIGS. 3–11) which is adapted to slide axially along leg member 76 is shown approximately at the center of leg member 76. Also, in this condition of the mobile seating arrangement, the seat and back portion 22 is in the upright position, and the folding framework of the apparatus is fully expanded for use as a functional stroller when it is desired that the person riding in the stroller be situated in a standard upright position. Also, a slotted bar 23 has its elongated slot 47 engaging a slot pin 41 fixed to a short stub 49 on the base member 56. The opposite end of slotted bar 23 is pivotally attached to leg member 76 by a slotted bar pivot pin 51 as best seen in FIG. 2 (and 9 and 11, described hereinafter).

The front "X" member 18 is in its fully horizontally expanded condition as viewed in FIGS. 1 and 2.

In FIG. 4, the handle 52 (only handle 52 shown in the left view) is pulled out of rigid side member 34 in a telescoping fashion, and since the bottom of the rear "X" member 14 is pivotally coupled to the framework 12 at the rear "X" member pivot 61, the back portion 24 may be tilted at any angle permitted by the lengths of telescoping tubes 48 and 60, shown by way of example in FIG. 4 at about 50 degrees from the vertical, as compared to the approximately 5 degree angle from vertical in the upright position shown in FIG. 3. Angles different from those depicted are achievable, dependent upon need.

Because of the need for the base of back 24 to move forward to attain the angle shown in FIG. 4, due to the connection of the seat member 26 to the telescoping tube 60 by the pivot coupler 64, the telescoping tube 60 likewise extends in telescoping fashion out of base member 56.

Figure 9:
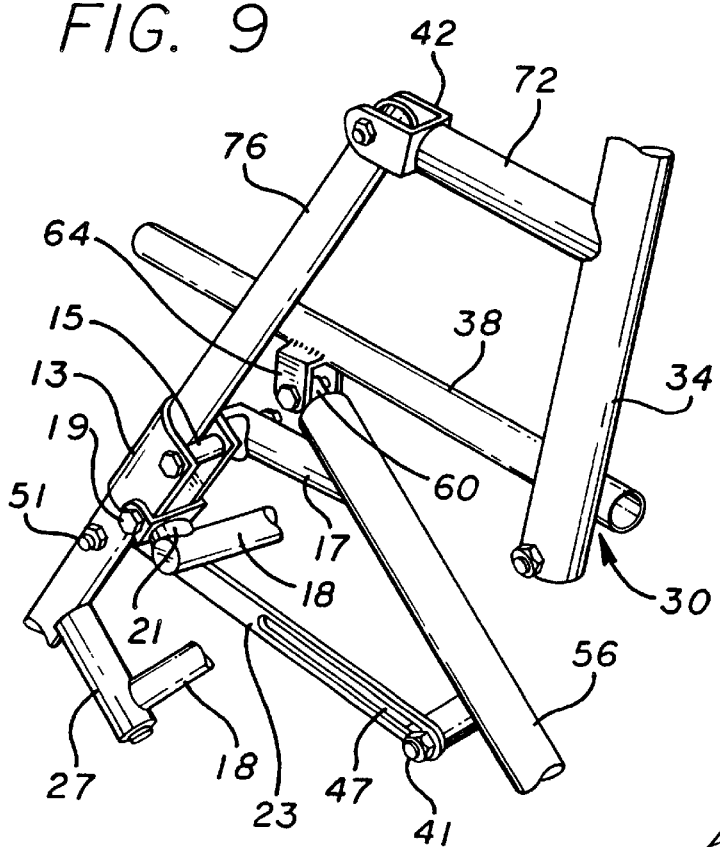
FIG. 9 is a left side, somewhat rearwardly view of the mechanism encompassed by the cutaway line indication 9 in FIG. 3.
Figure 11:
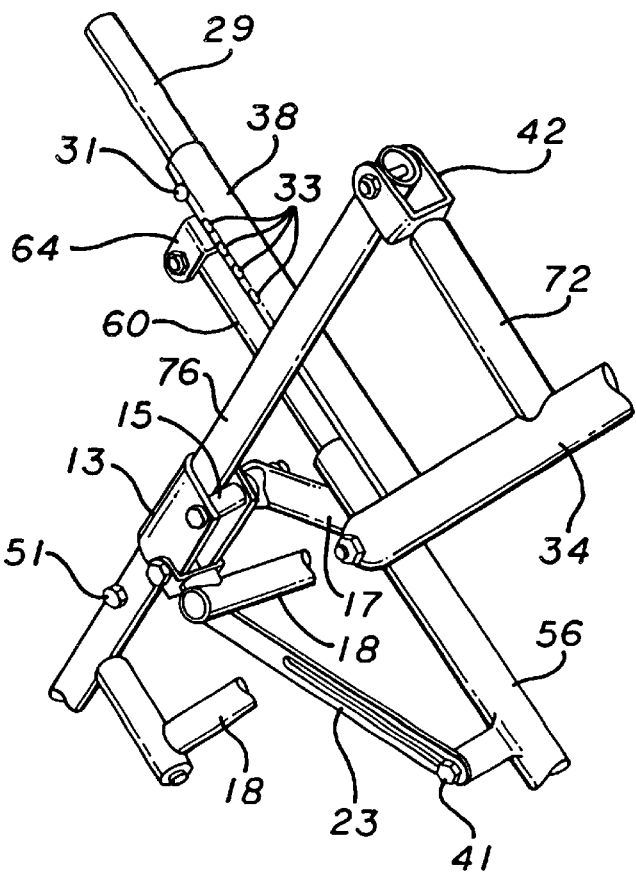
FIG. 11 is a left side, somewhat rearwardly view of the mechanism encompassed by the cutaway line indication 11 in FIG. 3.

FIGS. 9 and 11 show, respectively, a portion of the mechanical arrangement of FIGS. 3 and 4 indicated in those earlier figures by a corresponding cutaway designator. FIG. 9 shows the relative positions of important functional members when the seat is in the upright condition, and FIG. 11 shows the same elements with the seat in the fully reclined position. The rigid side member 34 represents the position of the back member 24, while the rigid side member 38 represents the position of the seat member 26.

A U-shaped pivot coupler 64 is fixed to rigid side member 38 for pivotally supporting the upper end of telescoping tube 60. Base member 56 is part of folding framework 12. A slant tube 17 is fixed to the base member 56, and its extended end is pivotally connected to the sliding connector bracket 13 by pivot pin 15. At the lower end of sliding connector bracket 13, a U-shaped pivot support bracket 19 is bolted to, and provides a pivot joint 21 for, the end of the upper leg of front "X" member 18. The bottom leg of front "X" member 18 is affixed to a rotatable extension tube 27 which is rotatably coupled to the leg member 76. Since the stroller is in a usable, i.e. expanded, condition, the pin or bolt 41 is at the forward end of the slot 47 in slotted bar 23. In this condition, the telescoping tube 60 is fully enclosed within the base member 56.

Figure 10:
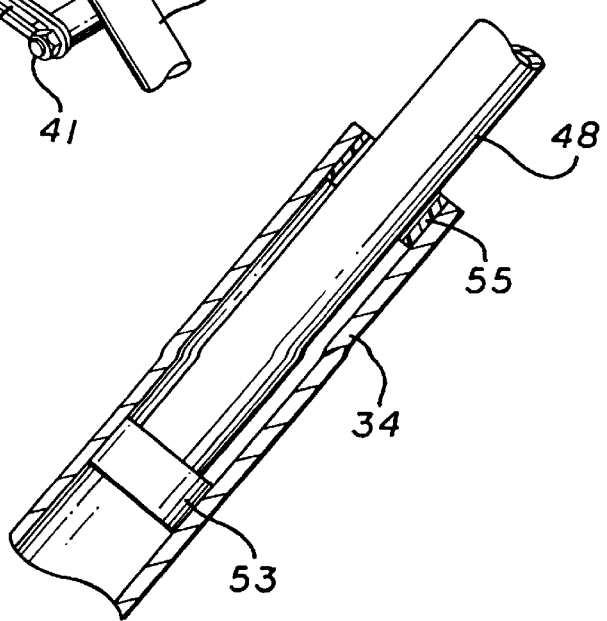
FIG. 10 is a partial cross sectional view of the left rigid side member and telescoping tube, taken along the lines 10—10 in FIG. 4.

FIG. 10 shows a cross sectional view of the telescoping arrangement in the back member 24, the view of FIG. 10 taken along the lines 10—10 in FIG. 4. In this figure, it can be seen that the telescoping tube 48, leading to the handle 52, has a piston 53 at its lower end sliding along the inner surface of hollow rigid side member 34. A bearing 55 is shown at the top of rigid side member 34 in a manner as would be understood by a person of ordinary skill in the art.

In FIG. 11, the seat and back portion 22 is again represented by the rigid side member 34 of the back member and rigid side member 38 of the seat member. Even though the seat and back portion has been tilted backwards in the FIG. 11 arrangement, the angle between the back and the seat is still approximately 90 degrees as it was in the upright position of FIG. 9. However, because of the tilting of the seat and back portion upwardly and rearwardly, respectively, and the connection between the rigid side members 34 and 38 at coupler 30, the end of telescoping tube 60 is pulled outwardly and upwardly by the pivot coupler 64 to the extent that the axis of base member 56 and telescoping tube 60 lies substantially parallel to the rigid side member 38 of the seat member 26. It should be noted that the slotted bar 23 is still at the same position as it was in FIG. 9, i.e. the integrity of framework 12 remains constant as the seat and back portion 22 moves from the upright to the recumbent positions. In this connection, the pivoting action of the seat and back portion 22 is made possible by the pivot coupling 42 at the top of leg member 76. That is, the entire seat and back portion 22 pivots about pivot coupling point 42.

It is to be noted that, in comparing the arrangements shown in FIGS. 3 and 4, the only members which pivot when tilting the seat and back portion 22 are the back and seat portion 22 and the rear "XI" member 14. Of course, the arm posts 72, fixed to the back 24 follow the back movement and are pivoted at pivot coupling 42. As explained, in order to accommodate the tilting of the seat from the position shown in FIG. 3 to that shown in FIG. 4 and back to the position in FIG. 3, the inner telescoping tube 48 of handle 52 and the inner telescoping tube 60 extend outwardly from their confining outer respective telescoping tubes, rigid side member 34 and base member 60. The remaining framework portion of the mobile seating arrangement remains stationary during this movement of the seat and back portion from one extreme to the other shown in FIGS. 3 and 4.

Importantly, in the unfolded condition shown in FIGS. 1–4, the slotted bar 23 provides rigidity for the structure, keeping sliding connector bracket 13 from moving from its position along leg member 76. For so long as slotted bar 23 is fully extended, sliding connector bracket 13 is fixed in place, and the seat member 26 and back member 24 are kept at right angles. As will be described hereinafter, the seat member 26 and back member 24 may fold toward one another as slotted bar 23 slides relative to pin 41.

FIG. 11 also shows the possibility of extending the rigid side member 38 of the seat member 26 forwardly to provide a deeper seat support, if desired. For this purpose, a tubular seat extension 29 telescopes into the rigid side member 38, and a latch pin 31 sets the seat extension 29 at a desired forward projected position. By moving the seat extension 29 into and out of rigid side member 38 and fixing the latch pin 31 in different holes 33 along rigid side member 38, the seat extension 29 can assume a number of possible, selectable positions.

With the seat returned to the FIGS. 1 and 3 condition, i.e. with the handles 50, 52 telescoped into rigid side members 32 and 34, FIG. 5 shows the rear view of the stroller, from which it can be seen that a hinged strut 39 is provided, connected between the bottom of base members 54 and 56. The hinged strut 39 is of a common design in which the strut folds (hinges) at its middle when the mobile seating arrangement is collapsed. The hinged strut 39 is hidden from view in FIGS. 1 and 2, but has the appearance identically the same as that shown in FIGS. 12 and 13 of another embodiment of the invention and shown there as hinged strut 139. The hinged strut 39 (FIG. 5) has its hinge at the center of the strut moved upwardly to permit the framework to collapse inwardly as the "X" members 14 and 18 collapse to approach vertical parallelism.

Thus, it will be appreciated that the hinged strut 39 is the only rigid connection from left to right sides of the folding framework 12, and once hinged, the "X" members 14 and 18 permit complete side-to-side collapsing of the apparatus to the condition shown in the side and front views of the collapsed stroller in FIGS. 7 and 8.

In addition to collapsing inwardly left-to-right, it is also required for minimum stowaway size that the mobile seating arrangement collapse front-to-back as well.

To accomplish this, the mobile seating arrangement of FIGS. 1–11 provide for collapsing of folding framework 12 in two stages, insofar as collapsing the arrangement front-to-back is concerned. First, as was seen in FIGS. 9 and 11, regardless of the position of the seat in either the upright or recumbent position, the sliding connector bracket 13 remains at the same position along leg member 76.

However, if the handle 52 is restrained from moving upwardly, and the seat member 26 is hinged upwardly toward the back member 24, as indicated by arrow 57a in FIG. 6, this forces the telescoping tube 60 to be extended, which in turn causes the base member 56 to pivot rearwardly.

In FIG. 6, such pivoting of base member 56 is approximately halfway through its rotational limits, and this is evident by reference to the fixed slant tube 17 which, in all configurations shown in FIGS. 1–14 is horizontal to the ground, and yet in FIG. 6 it is shown to be moved angularly clockwise by about 45 degrees.

Since the free end of slant tube 17 is pivotally coupled to the sliding connector bracket 13, bracket 13 slides upwardly along leg member 76. However, leg member 76 carries the pivotal connection of the upper element of front "X" member 18. Since the lower end of front "X" member 18 is connected to a rotatable extension tube 27 the axis of which is fixed relative to leg member 76, the front "X" member 18 begins to collapse toward vertical parallelism. That is, as sliding connector bracket 13 moves upwardly, the front "X" member 18 serves to draw in the left and rights sides of the folding framework 12 by drawing leg members 74 and 76 together. The hinged strut 39 and rear "X" member 14 follow in like manner, i.e. the elements of these two movable structural elements tend to move into vertical parallelism as well.

With the folding framework 12 completely collapsed side-to-side, i.e. similar to the condition shown in FIG. 6 except that the seat member 26 is moved to be approximately parallel to the plane of the back member 24, the front framework 20 still projects forwardly.

However, upon movement of the lower end of front framework 20 in the direction of arrow 57c shown in FIG. 6, the slotted bar 23 moves rearwardly such that the slot pin 41 slides along slot 47 until it is in the position relative to slotted bar 23 as shown in FIG. 7. At that point, the entire folding framework 12 is fully collapsed both side-to-side and front-to-rear.

Embodiment of FIGS. 12–16

FIGS. 12 through 16 show a second embodiment generally designated 100. The embodiment 100 has a folding framework member 102 having a rear "X" member 104 in the framework rear 106 and a front "X" member 108 in the framework front 110 to allow for folding of the framework 102 side-to-side.

A seat and back member 112 has a seat portion 114 and a back portion 116 which are provided with a fabric covering or any other means for supporting weight between spaced rigid bar members, such as webs, straps, rope, bands, etc.

Rigid side members 118 and 120 are provided for the back portion 116, and rigid side members 122 and 124 are provided in the seat portion 114.

The seat portion 114 is connected to the back portion 116 at connections 130 and 132. The connections 130 and 132 may be fixed or pivotal. The side members 118 and 120 of the back portion 116 are pivotally connected to "X" member 104 in regions adjacent the top as indicated at pivot connections 126 and 128, and the side members 118 and 120 are also pivotally connected to front legs 140 and 142 of the framework 102 employing pivot brackets 144 and 146 which are located between the pivot connections 126 and 128 and the seat/back connections 130 and 132. The rigid side members 122 and 124 of the seat portion 114 are pivotally connected at their underside to telescoping tubes 150 and 152 by pivot couplers 154 and 156. The telescoping tubes 150 and 152 move into and out of rear legs 160 and 162 of the framework 102 as the embodiment 100 moves between the upright and recumbent positions shown in FIGS. 12 and 13, respectively and in FIGS. 14 and 15, respectively.

Figure 12:
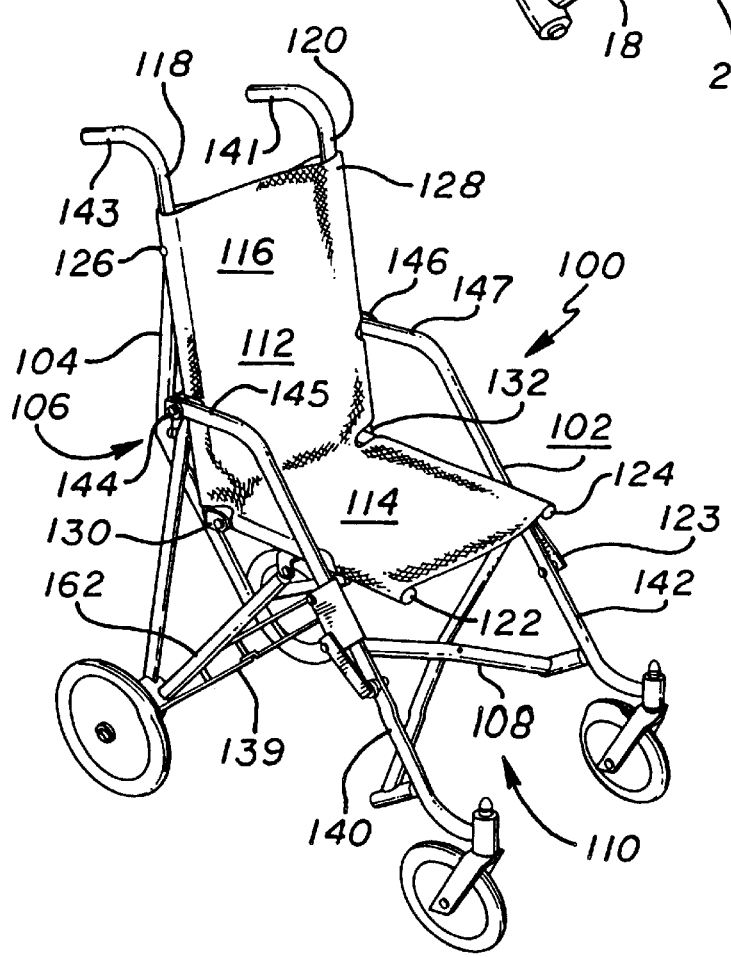
FIG. 12 is a right side perspective view of the mobile seating arrangement in accordance with a second preferred embodiment of the invention, showing the seat and back portion in an upright position.
Figure 13:
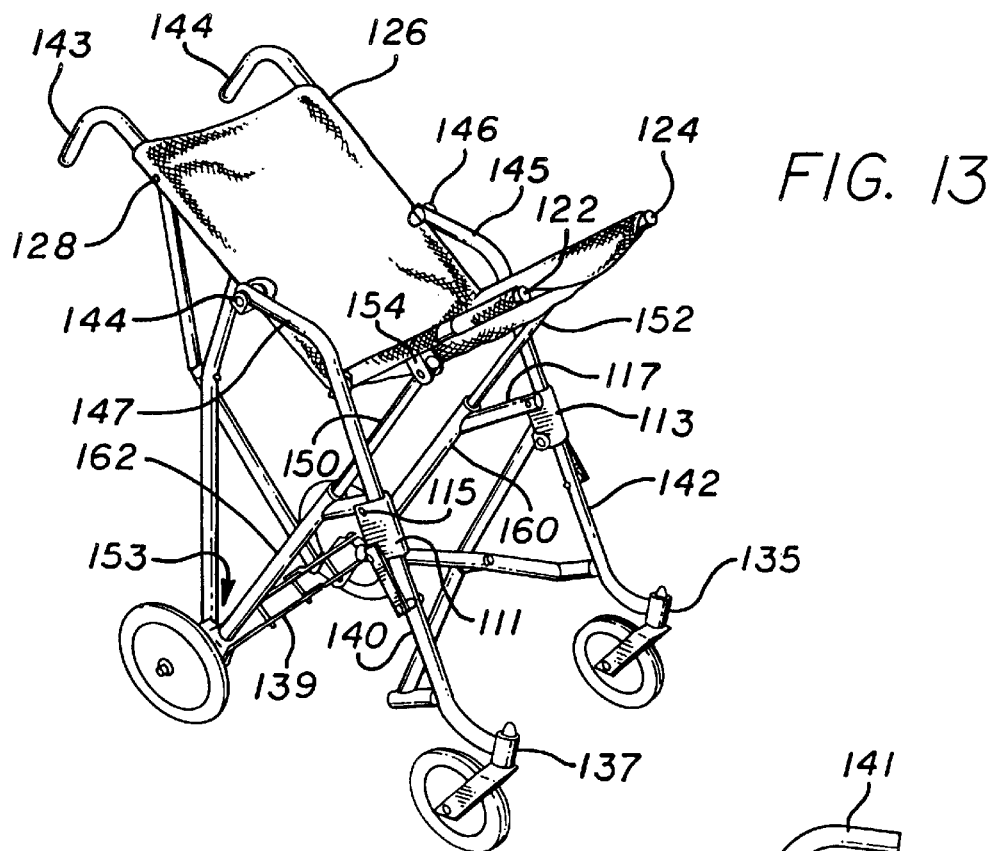
FIG. 13 is a similar view to that of FIG. 12, but with the seat and back portion reclined to a recumbent position.
Figure 14:
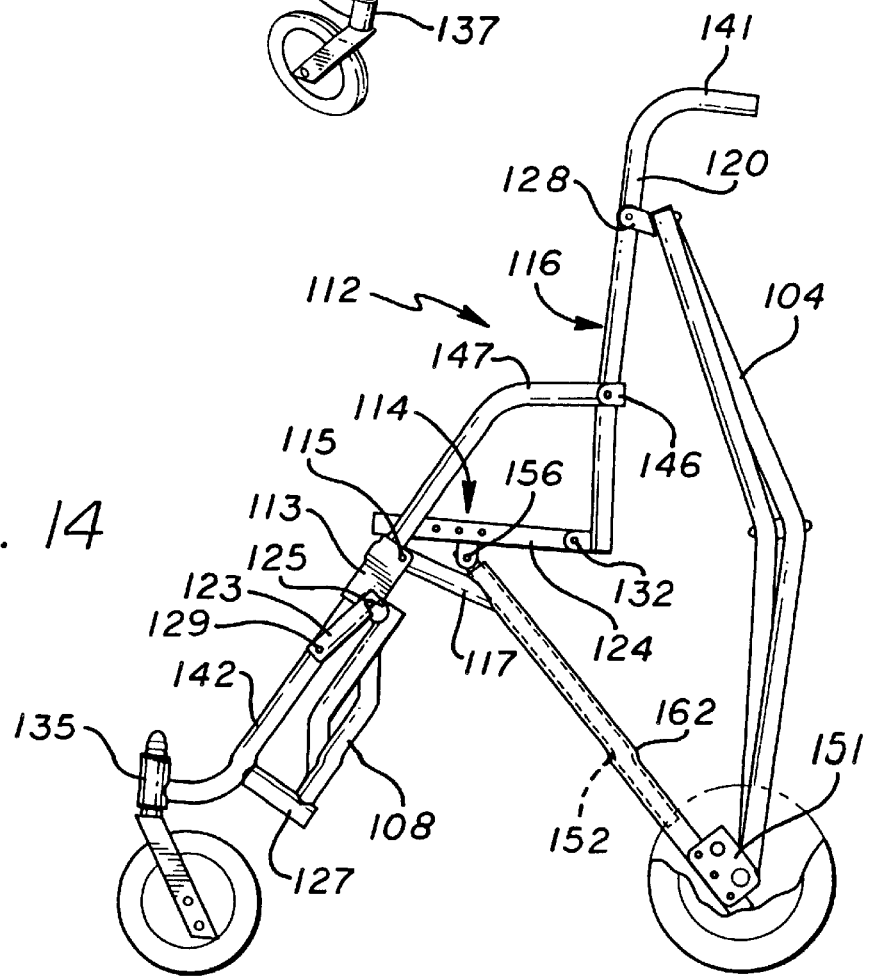
FIG. 14 is a left side elevation view of the FIG. 12 embodiment, showing the main structural components and their mechanical relationship when the seat and back portion is in the upright position.
Figure 15:
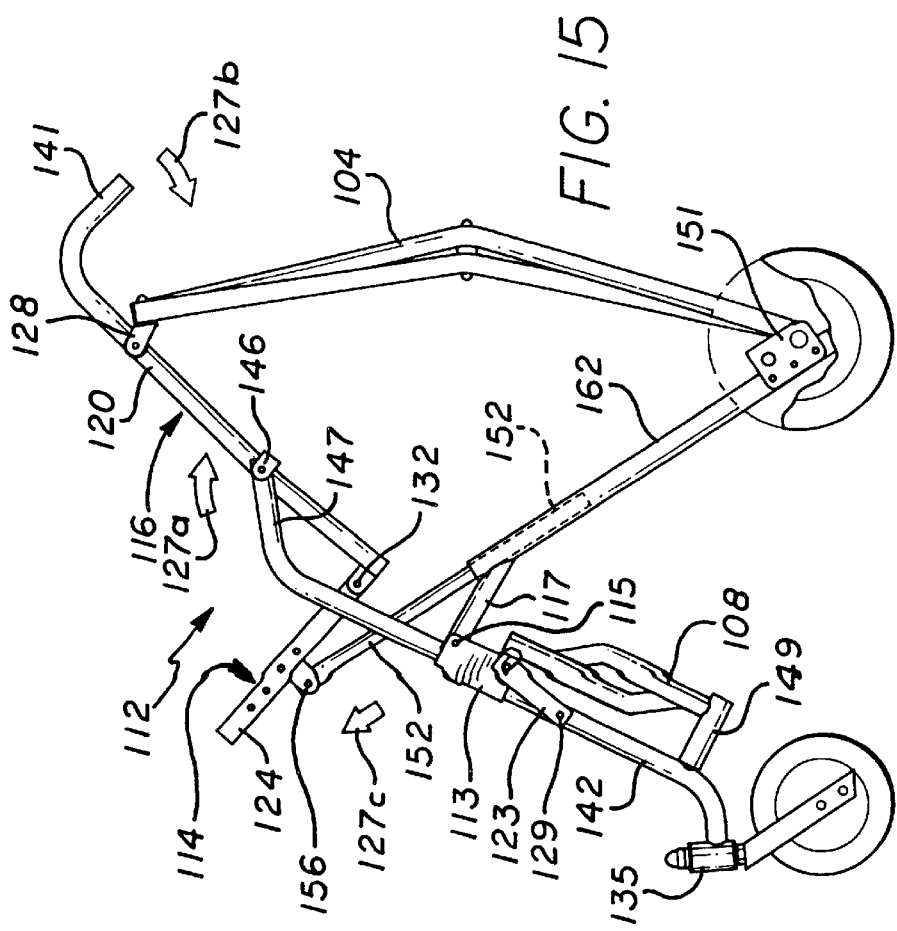
FIG. 15 is a view similar to that of FIG. 14, but with the seat and back portion in the recumbent position.

Because of the positions of the pivot points in embodiment 100, the front legs 140 and 142 of the framework 102 move toward the rear legs 160 and 162 as the seat and back member 112 moves from the position shown in FIGS. 12 and 14 to the position shown in FIGS. 13 and 15. These views of the second embodiment assume a rigid nonpivotable connection between the seat portion 114 and back portion 116 at connections 130 and 132.

If the connection 132 is not a pivotal connection, i.e. if it is fixed, then the sliding connector bracket 113 is forced to be maintained at the position along front leg 142 which permits the 90 degree angle formation of the seat and back member.

For the variation of this embodiment of the invention in which the connection 132 is a pivotal connection, if it is desired that a 90 degree angle be maintained for the seat and back member 112, the sliding connector bracket 113 must be kept at the aforementioned particular position along front leg 142. This is made possible by the provision of a latch 123 hinged to front leg 142 by a latch hinge 129. The latch pin 125, for providing a pivoting connection for the top end of front "X" member 108, projects outwardly from sliding connector bracket 113 slightly to form a latch pin collar about which a slot 131 in the latch 123 is engaged. By such engagement of the slot 131 about the collar of latch pin 125, the sliding connector bracket 113 is selectively held at a fixed position along front leg 142, and therefore the seat and back member 112 will remain in a substantially 90 degree angle formation at all positions of the seat and back member 112 between the upright position shown in FIGS. 12 and 14 and the recumbent position shown in FIGS. 13 and 15.

On the other hand, in the embodiments wherein the connections 130 and 132 are pivotal connections, the seat portion 114 may move to have a greater angle with respect to the back portion 116 than the substantially 90 degree angle for the upright seating position of FIG. 12. For example, referring to the side view in FIG. 14 of this embodiment, it will be noted that the seat and back portion 112 forms a substantially right angle. With the seat and back portion 112 forming a right angle, the sliding connector bracket 113 is positioned at a particular location along the length of front leg 142, and latch 123 is unlatched from latch pin 125. That is, sliding connector bracket 113 now may be slid up and down along front leg 142 which, in turn, moves slant tube 117 along with it. Slant tube 117 is pivotally mounted to sliding connector bracket 113 by a pivot pin 115.

In the condition shown in FIGS. 12 and 14, and assuming connections 130 and 132 are pivotal connections, the front of each rigid side member 124 rests on the upper end of slant tube 117 so as not to permit the seat portion 114 to tip forward.

Since slant tube 117 is fixed to rear leg 162, and since the telescoping tube 152 connects to the rigid side member 124 of the seat portion 114, the seat portion 114 is forced to pivot about the seat/back connection 132, if indeed the seat/back connection 132 is a pivotal connection. Therefore, without latch 123 latched, as the rigid side members 118 and 120 of back portion 116 pivot in the direction of arrow 127*a* (FIG. 15), this tends to put the plane of the seat portion 114 into the plane of the back portion 116, i.e. the seat and back member 112 approaches a flat support surface with the seat portion 114 tilting further and further forwardly due to the movement of pivot connection 132 moving upwardly and forwardly while the rigid side member 124 of seat portion 114 still rests (in a sliding and pivoting manner) on the top of slant tube 117. Without latch 123 maintaining sliding connector bracket 113 in a fixed position, sliding connector bracket 113 is free to move slightly downwardly along front leg 142. Thus, in the position of the back rigid side member 120 shown in FIG. 15, the seat portion 124 would be at an angle substantially the same as that of back rigid side member 120, as is clear from a simple mechanical analysis whereby the seat rigid side member 124 extends from pivot connection 132 to the upper end of slant tube 117.

This embodiment of the invention will thus be useful for those occasions where an individual being carried by the mobile seating arrangement must be assisted in getting out of the mobile seating arrangement by the provision of a seat that tilts forward. Accomplishing this is quite simple with this embodiment of the invention, by pulling back on the handle portions 141 and 143.

When latch 123 is latched with the collar of latch pin 125, and the seat and back member 112 is pivoted backwards as shown by arrow 127*a* in FIG. 15, the handle end of rigid side member 120 is pivoted about offset pivot coupler 128 in the direction of arrow 127*b*. As described above, the latched condition forces the seat portion 114 and pack portion 116 to maintain a 90 degree angle with respect to each other. This causes the telescoping tube 152 to move out of rear leg 162 in the direction of arrow 127*c*. From the mechanics illustrated in FIGS. 14 and 15, it will be appreciated that when the rigid side member 120 is rotated about pivot bracket 146 in the direction of arrow 127*a* until it is substantially parallel with the arm rest portion 147 of the front leg 142, the telescoping tube 152 is at its maximum extension out of rear leg 162. At that position, unlatching the latch 123 permits sliding connector bracket 113 to be slid down front leg 142 until it abuts the latch hinge 129. At this position of sliding connector bracket 113, the slant tube 117 has been pulled downwardly to its furthest extent, and the rear leg 162 and telescoping tube 152 follow. This action pivots the seat portion 114 downwardly until it is substantially in a planar relationship to the back portion 116. While these relative positions of the seat portion 114, back portion 116, arm rest portion 145, and sliding connector bracket 113 are not shown in the drawing, a basic mechanical analysis of the arrangement shown in FIGS. 14 and 15 will be self-evident to a person of ordinary skill in the art.

Figure 16:
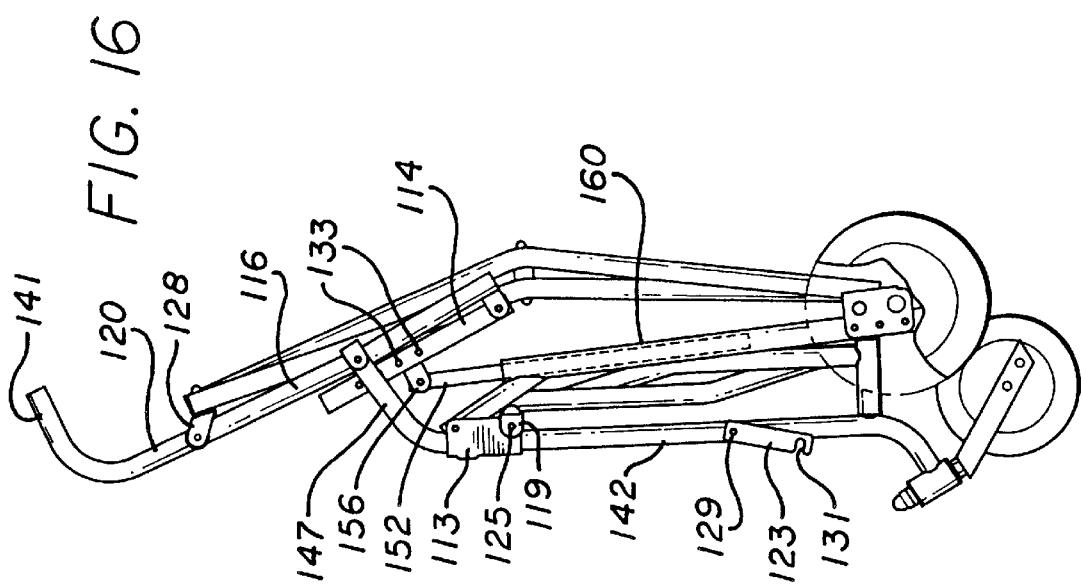
FIG. 16 is a view similar to that of FIG. 15, but with the apparatus fully collapsed into a stowaway condition.

It will also be understood from basic mechanical analysis in viewing FIGS. 14–16 that, when the latch 123 is unlatched, and seat portion 114 is pivoted in the direction of arrow 127*a* toward the back portion 116, the sliding connector bracket 113 slides up front leg 142. Since the top of "X" member 108 is pivotally connected to the latch pin 125 (which also serves as the latch pin collar for latch 123), the top ends of "X" member 108 are likewise pulled upwardly tending to collapse the "X" framework horizontally. Because the lower end of "X" member 108 is fixed to the rotatable extension tube 149 which is axially fixed to the front leg 142, the "X" member 108 is forced to collapse inwardly toward vertical parallelism of the two cross members comprising the "X" member 108. This action draws the left and right front legs together, which in turn through the connection of the front legs 140 and 142 with the rigid side members 118 and 120 of the back portion 116, causes the cross members of the rear "X" member 104 to collapse horizontally, i.e. toward vertical parallelism.

Similarly, with the slant tube 117 being pulled rearwardly by the pivoting of the seat portion 114 rearwardly, the front leg 142 is pulled backwards, and the entire mobile seating arrangement thus collapses both side-to-side inwardly and front-to-rear inwardly. Of course, prior to collapsing the mobile seating arrangement, the hinged strut 139 (FIG. 13) must be unlocked and hinged upwardly to permit the side-to-side collapsing motion.

When maximum collapsing motion in both planes is complete, the folded structure has the appearance shown in FIG. 16. In FIG. 16, it will be noted that the seat portion 114 has been hinged to be parallel with the back portion 116, the sliding connector bracket 113 has been moved to its maximum height along front leg 142, the front and rear "X" members 108 and 104 are in their maximum horizontally collapsed state, and the telescoping tube 150 is nominally extended to permit the rigid side members 118 and 120 to have a forward attitude such that the entire mobile seating arrangement is of minimal dimension in the front-to-rear dimension.

Embodiment of FIGS. 17–22

FIGS. 17 through 22 illustrate an embodiment 200 of the present invention which has a framework 202 and a seat and back member 204. The seat and back member 204 has a seat portion 206 and a back portion 208, both of which may be fabric covered or be provided with any other means for supporting weight between spaced rigid bar members, such as webs, straps, rope, bands, etc.

The seat portion 206 has rigid side members 210 and 212. The back portion 208 has rigid side members 214 and 216 which are connected to the side members 210 and 212 of seat portion 206 at connections 218 and 220 fixed to the lower ends of rigid side members 214 and 216.

The framework 202 has a rear "X" member 222 at the framework rear 224 and a front "X" member 226 at the front 228. The framework 202 has a pair of front legs 201 and 203 extending forwardly from the back portion 208 to the front wheel journals 205 and 207. The tops of front legs 201 and 203 are bent to form arm rests 209 and 211.

The framework has a pair of side tubes 230 and 232 pivotally coupled to the arm rests 209 and 211, respectively, by pivot connectors 213 and 215 intermediate the ends of side tubes 230 and 232 as best seen in FIGS. 19 and 20. The rigid side members 214 and 216 are slidably mounted for axial movement within side tubes 230 and 232 in the directions indicated by the arrow 240 (FIG. 17) as the embodiment 200 moves from the upright position shown in FIGS. 17 and 19 to the recumbent positions shown in FIGS. 18 and 20.

Figure 17:
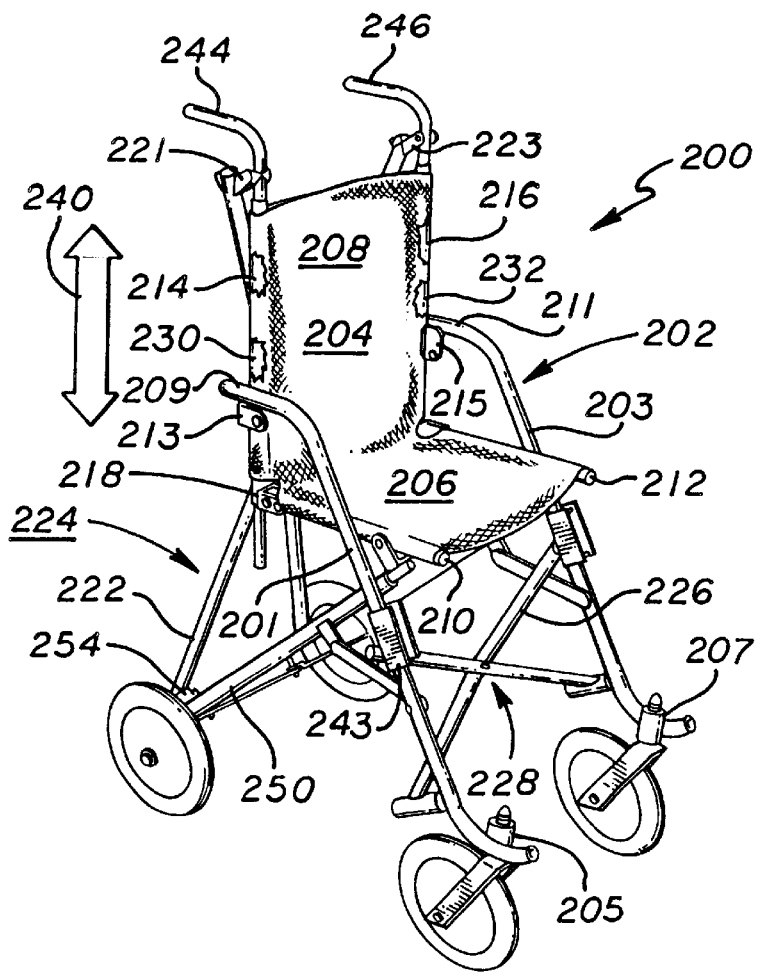
FIG. 17 is a right side perspective view of the mobile seating arrangement in accordance with a third embodiment of the invention, showing the seat and back portion in an upright position.
Figure 18:
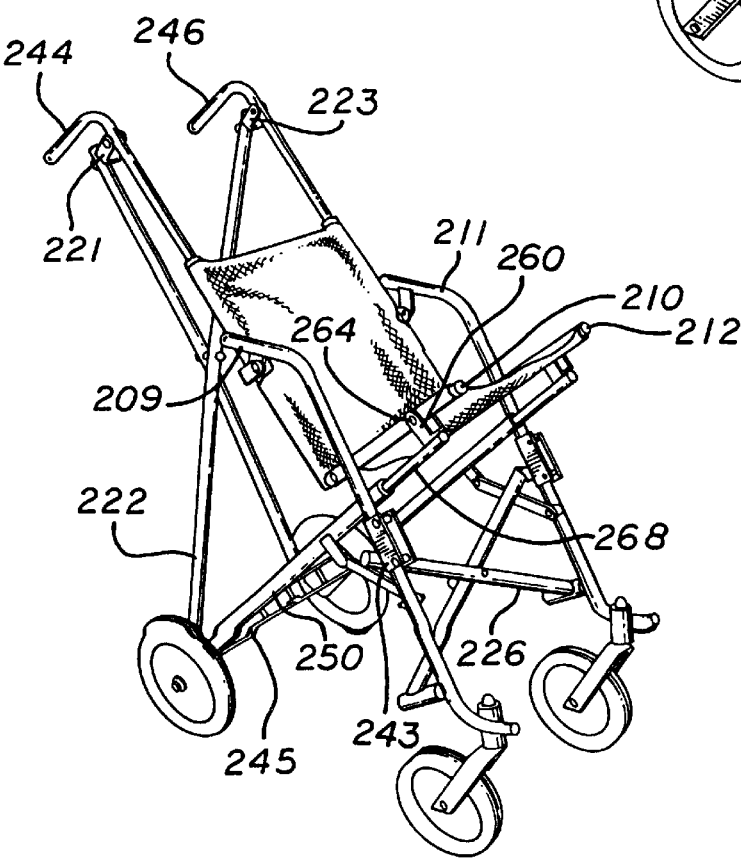
FIG. 18 is a similar view to that of FIG. 17, but with the seat and back portion reclined to a recumbent position.

The handles 244 and 246 extend into the rigid side members 214 and 216 of back portion 208 and are slidably movable therein for movement in axial directions as the embodiment 200 moves from the upright position shown in FIGS. 17 and 19 to the recumbent position shown in FIGS. 18 and 20.

The lower end of rear "X" member 222 is pivotally connected to the rear legs 250 and 252 at the lower rear "X" member pivots 254 and 256 which permit left-to-right and front-to-rear pivoting of the rear "X" member 222 for both left-to-right folding movement and movement towards and away from the framework front 228. The upper end of the rear "X" member is pivotally connected to the handles 244 and 246 by pivot connectors 221 and 223, again for dual pivoting action both front-to-rear relative to handles 244 and 266, and left-to-right effective when folding the framework 202 inwardly side-to-side. The rigid side members 210 and 212 of the seat portion 206 are pivotally connected to arms 260 and 262 at pivot points 264 and 266. The arms 260 and 262 are rigidly coupled to telescoping tubes 268 and 270 which telescope into and out of rear legs 250 and 252.

As indicated above, the seat/back connections 218 and 220 are fixed to the lower ends of rigid side members 214 and 216 of the back portion 208. As best viewed in FIGS. 19 and 20, front and back seat attachment points 217 and 219 attach the rigid side members 210 and 212 of the seat portion 206 to the respective connections 218 and 220. If both attachment points 217 and 219 are connected to the rigid side member 212, the seat portion 206 remains at approximately a right angle to the back portion 208 in both the upright and recumbent positions as shown in FIGS. 17, 19 and 18, 20, respectively. However, it was indicated previously that the seat portions of the invention can be articulated relative to the back portions, and this would be the case if either one of the attachment points 217 or 219 was removed, permitting the seat portion 206 and back portion 208 to pivot relative to one another about the other attachment point.

Since the mechanical arrangements shown in FIGS. 17–20 are substantially to scale, if, for example, the attachment point 219 shown in FIG. 19 is disengaged, and likewise the similar attachment point on the right side of the mobile seating arrangement (not visible in the drawing), as the back portion 208 is pivoted backward about pivot connectors 213 and 215, and the rear "X" member 222 likewise pivots backward about lower rear "X" member pivots 254 and 256, the handles 244 and 246 move downwardly as indicated by arrow 225a, the back portion 208, pivoting about pivot connectors 213 and 215, forces the bottom of the back portion to pivot about pivot connectors 213 and 215, as shown by arrow 225b.

At the same time, the seat portion 206 is forced forwardly by the attachment point 217 to the lower end of the back portion 208. The telescoping tube 270 necessarily moves out of rear legs 250 and 252 as indicated by arrow 225c, and, due to the pivot points 264 and 266 on arms 260 and 262, the seat portion 206 tends to become more horizontal. Moreover, while the back portion 208 continues to recline backward becoming more horizontal, the seat portion 206 continues to tilt forward becoming more horizontal. An extension of this mechanical analysis will produce an arrangement of the seat and back member 204 to be such that the back portion 208 and the seat portion 206 lie in a common horizontal plane (not shown). This embodiment of the invention will thus be useful for those occasions where an individual being carried by the mobile seating arrangement must be carried in a fully reclined position.

In the condition that attachment point 219 is removed, the seat portion 206 is free to articulate about seat attachment point 217. The seat portion 206 is horizontal in FIG. 19, and therefore, upon movement of the handles 244 and 246 backwards, the back portion 208 begins to recline continuously, while the seat portion 206 is pushed forward. However, as the seat portion 206 rotates away from the back portin 208, the distance between pivot 215 and pivot 266 increases,. forcing the telescoping tube 270 to extend. In effect, this tends to keep the seat portion 206 substantially horizontal. This embodiment of the mobile seating arrangement thus provides a more comfortable resting position for the person using it, without need to alter the position of the user's legs or lower body portion.

FIG. 21 shows the dual telescoping arrangement comprising the side tube 232, the rigid side member 216 of the back portion 208, and one of the handles 246. At the end of handle 246, there is placed a piston 237 wiping against the inner surface of rigid side member 216. A bearing 235, as is commonly provided in telescoping arrangements, is shown at the top of rigid side member 216. Likewise, bearings 239 and 241 at the top and bottom of the side tube 232 permit the side tube 232 to slide easily along the outer surface of rigid side member 216 and prevent contamination of the space between these two members. The various positions of the handles 244 and 246, the rigid tubes 214 and 216, and the side tubes 230 and 232 are visible in FIGS. 19, 20, and 22 showing the hidden members in those figures in dashed lines.

Figure 22:
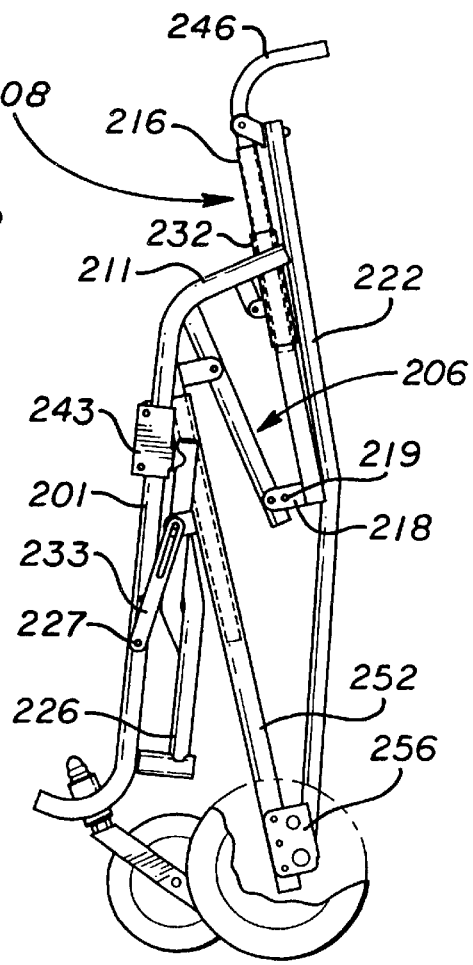
FIG. 22 is a view similar to that of FIG. 20, but with the apparatus fully collapsed into a stowaway condition.

The mobile seating arrangement of FIGS. 17–22 is collapsible front-to-rear and side-to-side by observing the progression of the apparatus from FIG. 19 wherein the seat and back member 204 is in an upright position, to FIG. 20 in which the seat and back member 204 is tilted backward, and finally to FIG. 22 in which the attachment point 219 has been withdrawn, and the seat portion 206 is pivoted upwardly against the back portion 208.

Prior to collapsing the mobile seating arrangement, the hinged strut 245 must, of course, be released by pivoting its center in a manner commonly known in the art.

At the same time, a brace 233, pivoted on the front leg 203 at a pivot point 227 and slidably pivotable about a pivot point 229 fixed to rear leg 252 through a slot 231 in brace 233, permits the front and rear legs 203 and 252 to lie adjacent one another axially. As part of the folding or collapsing action, as the handle 246 moves forwardly, the rear "X" member 222 pivots forwardly about lower rear "X" member pivot 256, and all of this action results in the front-to-back collapsed position shown in FIG. 22. Concerning the collapsing of the mobile seating arrangement of this embodiment side-to-side, the movement upwardly of the sliding connector bracket 243, to which the top of rear leg 252 and the top of front "X" member 226 are pivotally attached, the front "X" member 226 is forced to collapse inwardly side-to-side, and the rear "X" member 222 follows this action by also collapsing side-to-side drawing the handles 244 and 246 further outwardly from rigid side member 216 of the back portion 208, as required.

Embodiment of FIGS. 23–27

Embodiment 300 is shown on FIGS. 23 through 27 and has a framework 302 provided with a rear "X" member 304 at the rear 306 and a front "X" member 308 at the front 310. A seat and back member 312, having a seat portion 314 and a back portion 316, is mounted on the framework 302. The back portion 316 has rigid side members 320 and 322, and the handles 324 and 326 have portions 328 and 330 that telescope into and out of the rigid side members 320 and 322 of the back portion 316.

The seat and back member 312 has a seat portion 314 and a back portion 316, both of which may be fabric covered or be provided with any other means for supporting weight between spaced rigid bar members, such as webs, straps, rope, bands, etc.

The handles 324 and 326 are pivotally connected to the top of the rear "X" member 304 by offset pivots 340 and 342 which permit pivoting front-to-rear and left-to-right, essentially for folding the mobile seating arrangement.

The framework 302 has front legs 344 and 346 having upper ends 301 and 303, serving as arm rests, connected to the rigid side members 320 and 322 of the back portion 316 by pivot couplers 350 and 352. The framework 302 also has rear legs 354 and 356 which are rigidly connected to side coupler plates 360 and 362. The side plates 360 and 362 each have rear and front arcuate slots 364 and 366. The seat portion 314 has rigid side members 370 and 372 which are provided with left and right outwardly projecting slides 380 and 382 riding in slots 364 and 366.

Figure 25:
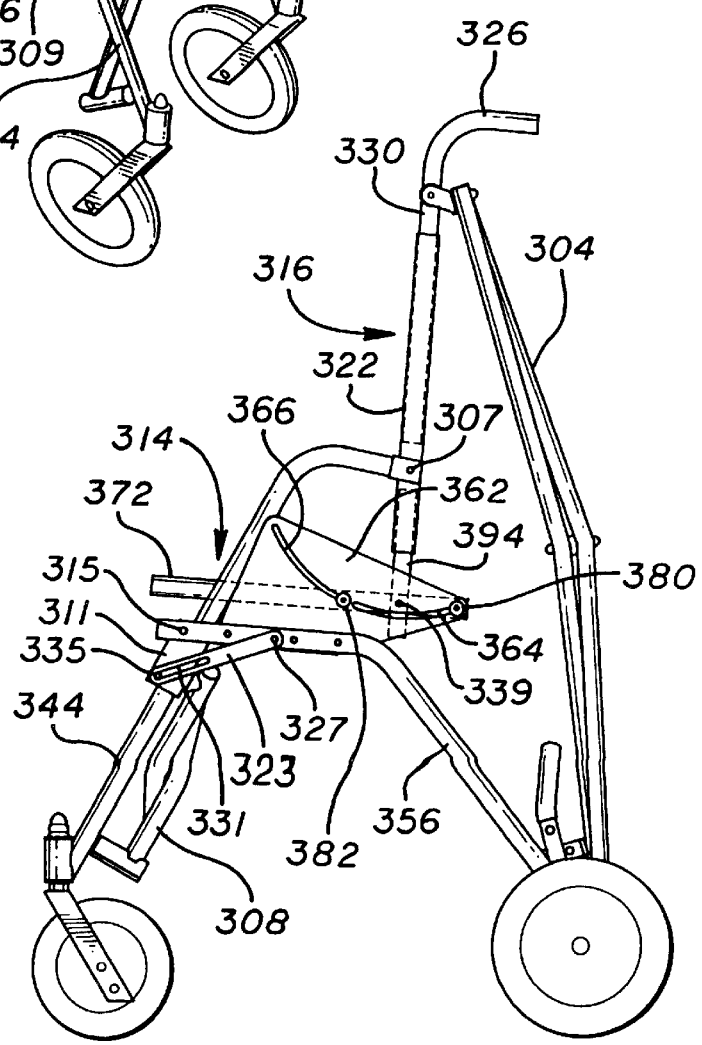
FIG. 25 is a left side elevation view of the FIG. 23 embodiment, showing the main structural components and their mechanical relationship when the seat and back portion is in the upright position.
Figure 26:
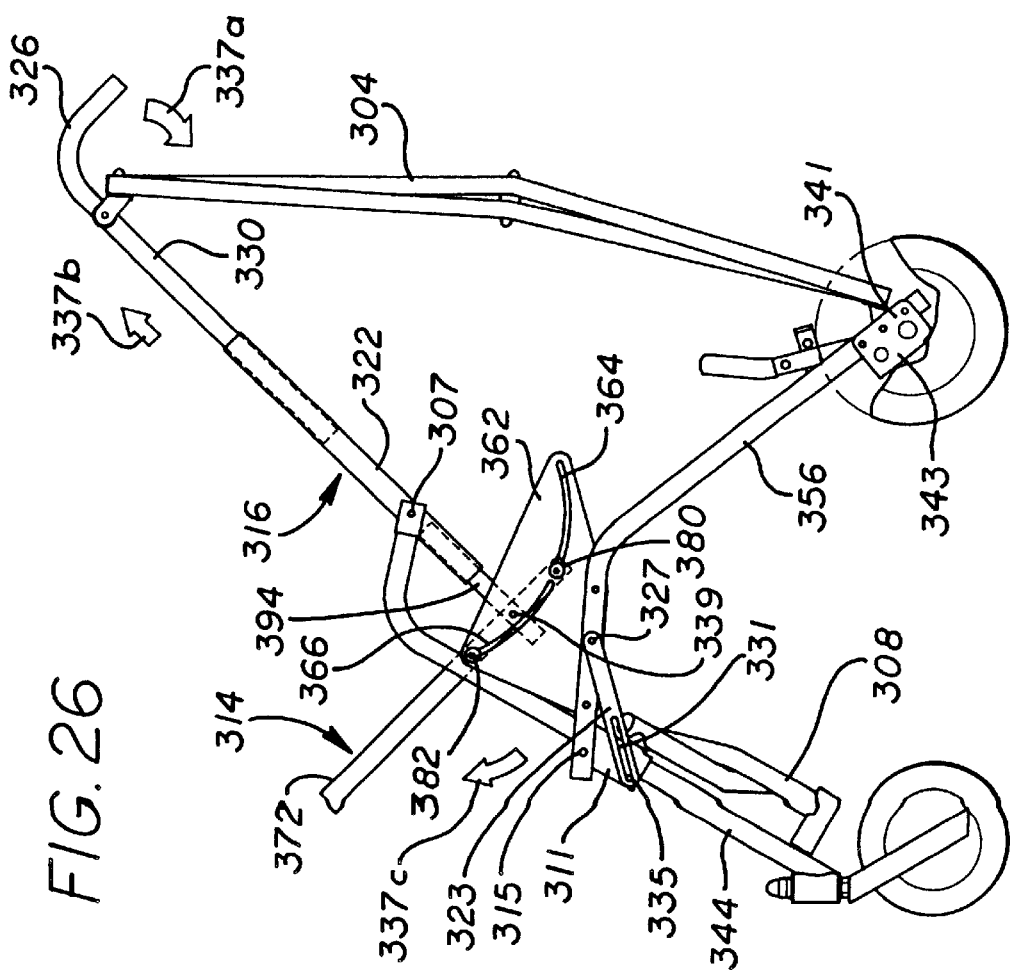
FIG. 26 is a view similar to that of FIG. 25, but with the seat and back portion in the recumbent position.

Bottom telescoping tubes 392 and 394, as best seen in FIGS. 25 and 26, are pivotally connected to the seat rigid side members 370 and 372 by bottom tube pivot connectors shown on the left side at 339 (right side bottom tube pivot connector not visible). The bottom telescoping tubes 392 and 394 move into and out of the bottoms of rigid sides members 320 and 322 of the back portion 316.

Figure 23:
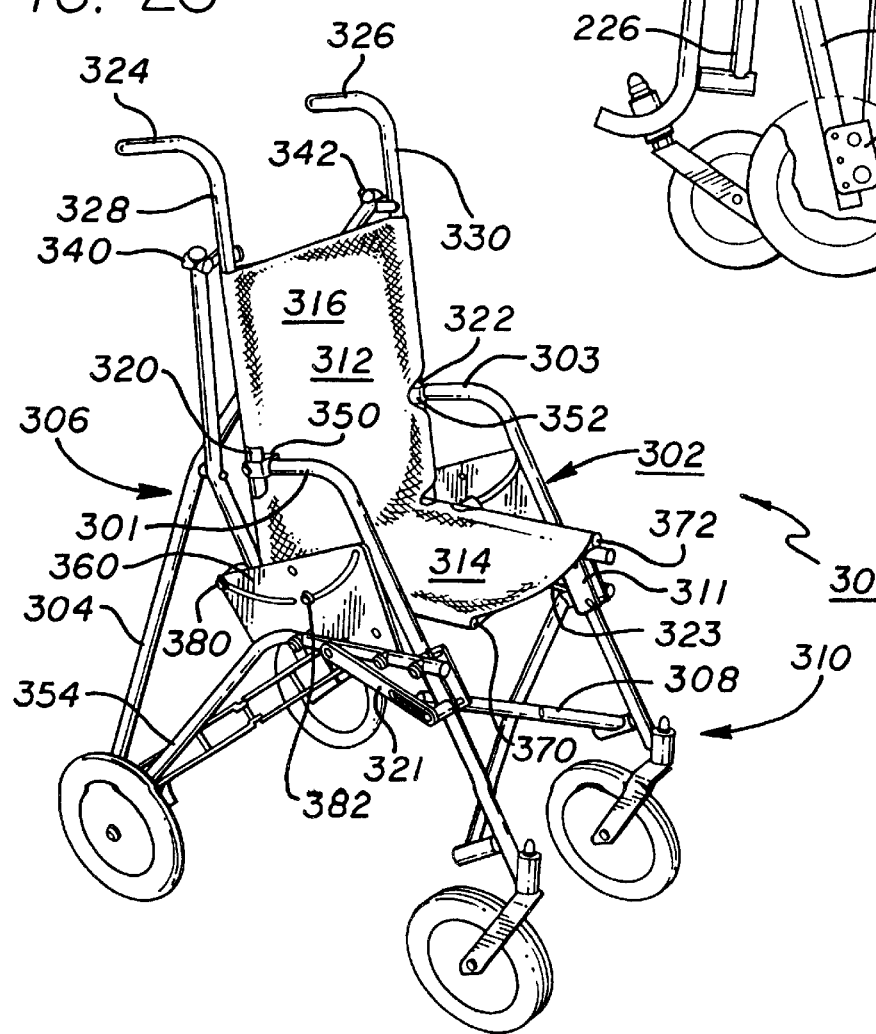
FIG. 23 is a right side perspective view of the mobile seating arrangement in accordance with a fourth embodiment of the invention showing the seat and back portion in an upright position.
Figure 24:
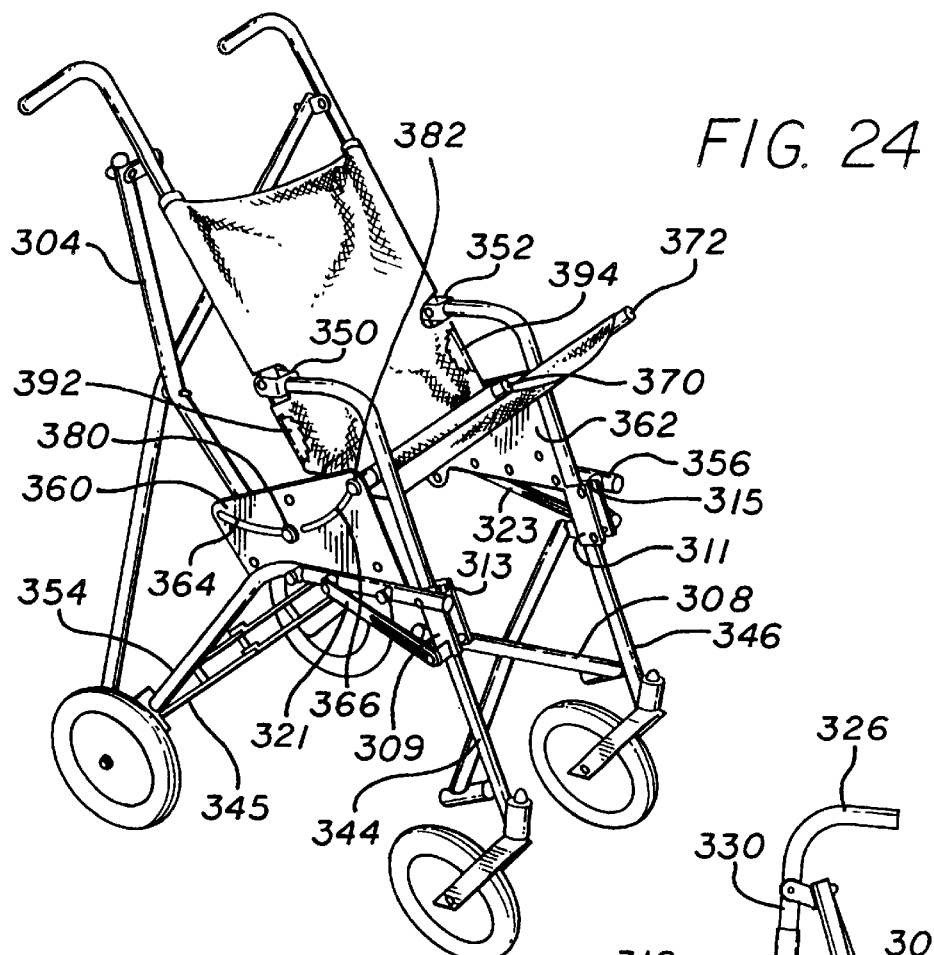
FIG. 24 is a similar view to that of FIG. 23 with the seat and back portion reclined to a recumbent position.

As the embodiment 300 moves from the upright position shown in FIGS. 23 and 25 to the recumbent position shown in FIGS. 24 and 26, the telescoping portions 328 and 330 of handles 324 and 326 extend further out of the side members 320 and 322 as the slides 380 and 382 move from the rear of arcuate slots 364 and 366 to the fronts thereof. The bottom telescoping tubes 392 and 394 may move further out or further in, dependent upon the desired configuration and positional location of the arcuate slots 364 and 366.

In the upright position of the mobile seating arrangement shown in FIGS. 23 and 25, the back portion 316 is substantially at right angles to the seat portion 314. As the handle 326 moves downward clockwise, represented by arrow 337a, the rigid side member 322, pivoting about pivot connector 307, moves its lower end also clockwise around pivot connector 307. This causes the handle portion 330 to telescope out of rigid side member 322 as shown by arrow 337b. Since the bottom telescoping tube 394 must follow the forward movement of the bottom of rigid side member 322, and because of its pivotal attachment to the seat portion 314 by bottom tube pivot connector 339, the seat portion 314 is forced to move forwardly and upwardly as indicated by the arrow 337c.

However, seat portion 314 is restricted in its rotational movement by the slides 380 and 382 confined to within the arcuate slots 366 and 364, respectively. Accordingly, seat portion 314 follows a predetermined angular path, and depending on the location of the arm pivot connector 307, the distance between the arm pivot connector 307 and the bottom tube pivot connector 339, and the location and curvature of the slots 366 and 364, the seat portion 314 and back portion 316 may take on different relative angular positions from the upright position shown in FIG. 25 and the recumbent position shown in FIG. 26.

In the specific apparatus drawn in FIGS. 25 and 26, it will be noted that, in moving from the upright to the recumbent position, the back portion 316 moves through a slightly larger angle than the seat portion 314. The opposite angular relationship could also easily be realized by, for example a smaller radius of curvature for slots 366 and 364.

When the apparatus is moved to the recumbent position shown in FIG. 26, it will be observed that the rear "X" member 304 pivots about bottom rear "X" member pivot 341 on the wheel bracket 343. Wheel bracket 343 mounts the lower ends of rear "X" member to pivot both front-to-rear and left-to-right.

Slotted braces 321 and 323 are provided to extend from a brace pivot 327 or rear legs 344 and 346 to a slide pin 335 sliding within a slot 331 of the brace 323. Braces 321 and 323 keep the front legs 344 and 346 from pivoting outwardly around pivot connector 307 due to a person's weight sitting in the seat of the mobile seating arrangement.

The mobile seating arrangement shown in FIGS. 23–26 can be collapsed side-to-side and front-to-rear for convenient and compact storage.

Prior to collapsing the mobile seating arrangement, the hinged strut 345 must, of course, be released by pivoting its center in a manner commonly known in the art.

Figure 27:
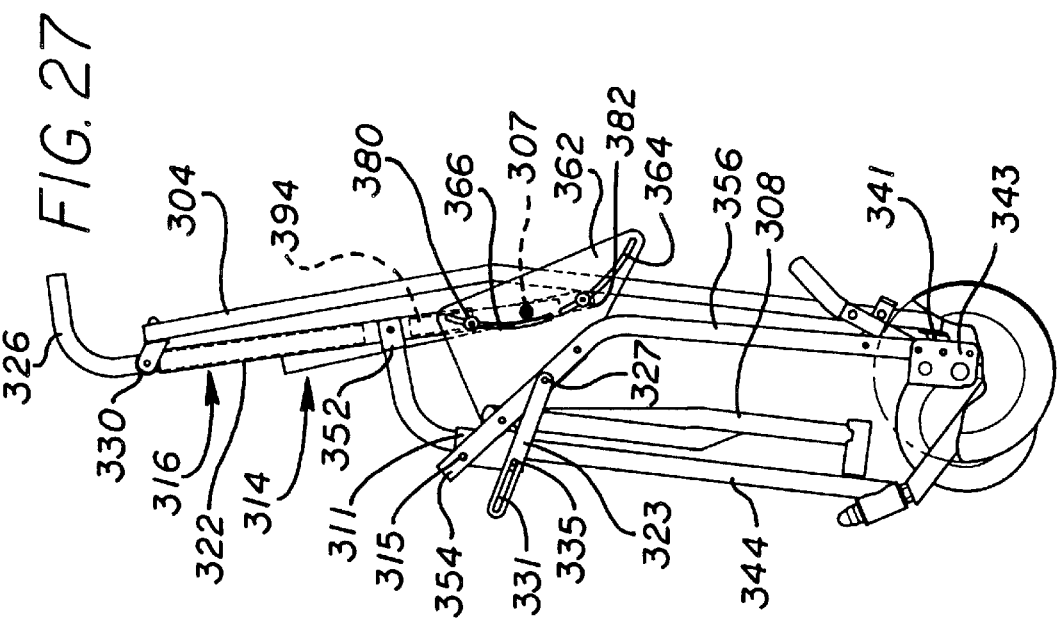
FIG. 27 is a view similar to that of FIG. 26, but with the apparatus fully collapsed into a stowaway condition.

To accomplish the collapsing function, the seat portion 314 is pivoted upwardly relative to the back portion 316, bringing these two structures together (ultimately to be substantially coplanar as shown in FIG. 27).

Although brace 323 prevents sliding connector bracket 311 from moving downwardly, the slot 331 provided in brace 323 permits the sliding connector bracket 311 to move upwardly during the collapsing function. As the sliding connector bracket 311 moves upwardly, and seat portion 314 moves into a coplanar relationship to the back portion 316, the front "X" member 308 is extended vertically which, due to its scissors action, draws the front legs 344 and 346 together side-to-side. Because of the mechanical connection between the front legs 344 and 346, the rigid side members 320 and 322 of the back portion 316, and the rear "X" member 304, the latter is forced to collapse inwardly as well, the cross elements of rear "X" member 304 being drawn together toward vertical parallelism to effect the full side-to-side collapsing function.

Due to the slot 331 provided in brace 323, the rear legs 354, 356 are permitted to come into parallel relationship to the front legs 344 and 346 as the sliding connector brackets 309 and 311 move upwardly to the position shown in FIG. 27. In FIG. 27, it will be noted that the seat portion 314 and back portion 316 are substantially coplanar, the front and rear "X" members 308 and 304 are in their maximum vertical extension, the slide pin 335 is moved toward the middle of brace 323, and the handle portion 330 has moved back down into the rigid side member 322.

In order to result in the compact collapsed configuration of FIG. 27, the rear "X" member 304 is constructed of slightly bent cross members such that the top portion of the cross members lie in a plane at a slight angle relative to the plane of the lower portion of the cross members. As can be seen in FIG. 27, this is advantageous when the mobile seating arrangement is to be made collapsible front-to-rear, as it tends to keep the collapsed structure weight balanced along a centerline through the collapsed structure.

While only certain embodiments have been set forth, alternative embodiments and various modifications will be apparent from the above description to those skilled in the art. For example: other sliding mechanisms can be used in place of the telescoping mechanisms shown and described (such as parallel sliding bars, parallel male and female slotted members, sliding tube and rod members, slidable channel and T-bar members, slidable dovetail arrangements, and nested C-channel rail members); which sections of a telescoping mechanism slides within the other is generally a matter of choice; the angles of movement may be chosen differently than those suggested herein in describing the preferred embodiments, by applying general mechanical principles; and different pivoting mechanisms than those shown and described herein could be used; to name a few. These and other alternatives are considered equivalents and within the spirit and scope of the present invention.

What is claimed is:

1. A mobile seating arrangement, comprising:
 a framework:
 a seat and back portion, the seat and back portion including a seat member and a back member;
 a tilting mechanism adapted to pivot said seat and back portion as a unitary structure between and upright position and a recumbent position, wherein the tilting mechanism pivots the seat and back portion independent of said framework;
 a hinge arrangement adapted to collapse said seat back portion front-to-rear, wherein said seat member is hinged to lie adjacent to said back member;
 said framework has a framework front, a framework rear, a left elongated leg member and a right elongated leg member, a lower end of each leg member being coupled to said framework front; and
 said seat and back portion comprises left and right arm rests projecting forwardly from said back member to an extended end, an upper end of each of said left and right leg members being pivotally coupled to said extended ends of said left and right arm rests, respectively, whereby
 movement of said seat and back portion by said tilting mechanism pivots said seat and back portion about said extended ends of said arm rests.

2. The mobile seating arrangement as claimed in claim 1, wherein said framework comprises:
 left and right sides; and
 an "X" member having cross elements with left and right ends joining said left and right sides, whereby said left and right sides are drawn toward one another upon said cross elements being brought together toward vertical parallelism, to collapse said framework side-to-side.

3. The mobile seating arrangement as claimed in claim 1, wherein said tilting mechanism is coupled to said framework employing pivot connections and telescoping tubes.

4. The mobile seating arrangement as claimed in claim 1, wherein the mobile seating arrangement comprises coupling devices for maintaining said seat and back members at a angle with respect to each other of approximately at least 90 degrees independent of the tilt position of said seat and back portion relative to said framework.

5. The mobile seating arrangement as claimed in claim 1, wherein said tilting mechanism is coupled to said seat and back portion, said seat and back portion being capable of moving between said upright position and said recumbent position and any position between said upright position and said recumbent position.

6. The mobile seating arrangement as claimed in claim 1, wherein:
 said framework comprises left and right expandable and contractible members, each expandable and contractible member having a first end and a second end;
 said seat member has left and right rigid side members; and
 said first ends of said left and right expandable and contractible members are connected to said framework rear,
 and said second ends of said left and right expandable and contractible members are pivotally coupled to said left and right rigid side members of said seat member.

7. The mobile seating arrangement as claimed in claim 6, wherein each expandable and contractible member comprises an outer tube and an inner elongated member adapted to slide axially within said outer tube, said outer tubes comprising said first ends of said left and right expandable and contractible members connected to said framework rear, and said inner elongated members comprising said second ends of said left and right expandable and contractible members pivotally coupled to said left and right rigid side members of said seat member.

8. The mobile seating arrangement as claimed in claim 7, wherein said back member comprises left and right rigid tubular side members, and said mobile seating arrangement comprises:
 left and right handles each having a handle end and an extended free end; and
 a linkage having upper and lower ends, said upper end of said linkage pivotally connected to said handle ends, said lower end of said linkage pivotally connected to said framework rear, and the free ends of said left and right handles are telescopically received, respectively, in said left and right rigid tubular side members of said back member, whereby the free ends of said handles are telescoped relatively further into said rigid tubular side members when said seat and back portion is in an upright position, and are telescoped relatively further outwardly when said seat and back portion is in a recumbent position.

* * * * *